(12) United States Patent
Behnke et al.

(10) Patent No.: US 11,428,270 B2
(45) Date of Patent: Aug. 30, 2022

(54) ROTATING EQUIPMENT HAVING STATIC TORQUE COUPLING BETWEEN DRIVER AND DRIVEN

(71) Applicant: ITT MANUFACTURING ENTERPRISES LLC, Wilmington, DE (US)

(72) Inventors: Paul Walter Behnke, Seal Beach, CA (US); Daniel Stephen Miller, Ontario (CA); Abhi Nutankumar Gandhi, South Pasendena, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 1008 days.

(21) Appl. No.: 15/999,162

(22) Filed: Aug. 17, 2018

(65) Prior Publication Data
US 2020/0056664 A1 Feb. 20, 2020

(51) Int. Cl.
*F16D 1/027* (2006.01)
*F04B 17/03* (2006.01)
*F16D 1/033* (2006.01)

(52) U.S. Cl.
CPC .............. *F16D 1/027* (2013.01); *F04B 17/03* (2013.01); *F16D 1/033* (2013.01);
(Continued)

(58) Field of Classification Search
CPC ...... F16D 1/027; F16D 1/033; F16D 2300/12; F04B 17/03; F05B 2240/60; F05B 2260/40; Y10T 403/1616
(Continued)

(56) References Cited

U.S. PATENT DOCUMENTS

| 1,422,339 | A | * | 7/1922 | Church | ...................... F16D 3/78 464/170 |
| 3,261,182 | A | | 7/1966 | Allen et al. | |

(Continued)

FOREIGN PATENT DOCUMENTS

| DE | 636539 C | 10/1936 |
| DE | 4011477 A1 | 10/1991 |

(Continued)

OTHER PUBLICATIONS

International Preliminary Report on Patentability issued by the International Bureau of WIPO in corresponding International Application No. PCT/US2019/046731 dated Feb. 23, 2021.

*Primary Examiner* — Greg Binda
(74) *Attorney, Agent, or Firm* — Carter, DeLuca & Farrell LLP; George Likourezos; Bret Shapiro

(57) ABSTRACT

Rotating equipment includes driver equipment, driven equipment and a rotating shaft coupling. The driver equipment includes a driver support connected to a stationary driver shaft, and also includes a driver arranged on the driver support with a driving shaft to rotate and provide a rotational torque. The driven equipment includes a driven unit support connected to a stationary driven unit shaft, and also includes a driven unit arranged on the driven unit support with a driven shaft to respond to the rotational torque and rotate. The rotating shaft coupling couples the driving shaft to the driven shaft and applies the rotational torque from the driving shaft to the driven shaft. The stationary driver shaft couples to the stationary driven unit shaft to provide a static torque load to counteract the rotational torque applied from the driving shaft to the driven shaft during operation.

10 Claims, 1 Drawing Sheet

Rotating Equipment

(52) U.S. Cl.
CPC ....... *F05B 2240/60* (2013.01); *F05B 2260/40* (2013.01); *F16D 2300/12* (2013.01); *Y10T 403/1616* (2015.01)

(58) Field of Classification Search
USPC ............ 464/170; 403/13; 248/440, 644, 673
See application file for complete search history.

(56) References Cited

U.S. PATENT DOCUMENTS

| | | | |
|---|---|---|---|
| 6,190,261 B1 * | 2/2001 | Powell | F16P 1/02 |
| | | | 464/170 |
| 2013/0078118 A1 | 3/2013 | Maier et al. | |

FOREIGN PATENT DOCUMENTS

| | | | | | |
|---|---|---|---|---|---|
| GB | 1 500 111 | * | 2/1978 | | 464/170 |
| GB | 2 069 099 A | * | 8/1981 | | 403/13 |

\* cited by examiner

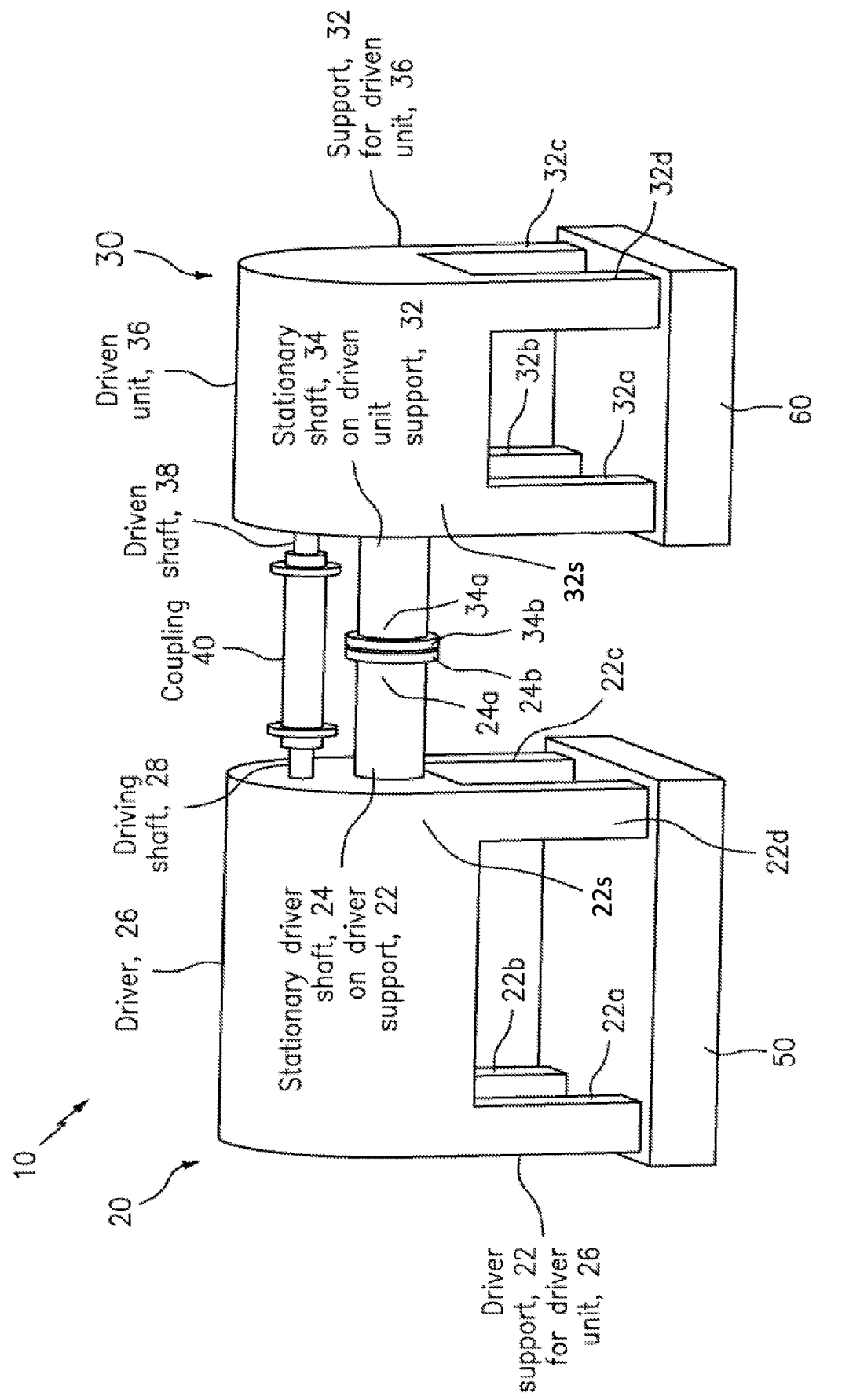

ROTATING EQUIPMENT HAVING STATIC TORQUE COUPLING BETWEEN DRIVER AND DRIVEN

BACKGROUND OF THE INVENTION

1. Field of the Invention

The present invention relates to a rotating equipment, e.g., like a pump system having a motor driving a pump.

2. Brief Description of Related Art

The problem to be addressed by the present invention is the misalignment between a driving shaft and a driven shaft, as typically seen in rotating equipment, due to the flexibility of the supporting stand under a torsional load. The resulting misalignment occurs despite ensuring alignment of the shafts before operating. As the driver is energized, the resultant torque of the assembly acts to move the shafts out of alignment.

In a sufficiently stiff assembly, the misalignment is minimal and can easily be handled by a flexible spacer coupling. However, in a tall assembly, where the shaft is significantly removed from the base/foundation, the misalignment becomes too large for any sort of flexible coupling. To address the excessive deflection, the structure can be stiffened to limit deflection to allowable limits. This solution becomes prohibitively expensive due to the amount of support material needed to achieve the required stiffness, especially in a high power and torque application.

There is a need in the industry for a better way to align a driving shaft and a driven shaft, e.g., especially in a tall assembly.

SUMMARY OF THE INVENTION

As an alternative to stiffening an assembly, the present invention creates a static torque load to counteract the applied torque of the driver during operation. By way of example, the present invention may consist of two shafts that are connected to supports for the driver support and driven machine support respectively. Shaft ends interface in such a way that each component can be positioned to achieve rotating shaft alignment and then a torsional preload can subsequently be applied statically. The only constrained degree of freedom of the present invention is in the rotation about the connecting stationary shafts. The shafts are free to move axially before startup relative to each other.

The torque applied to the stationary shafts is in the opposite direction of the torque applied by driver. This torque acts on both supports to restore the alignment of the shafts under load. The static torque applied is proportional to the torque delivered to the machine, in order to keep the rotating shafts' misalignment minimal.

The new rotating equipment design according to the present invention provides a better way to counteract applied torque of rotating drive shafts by connecting stationary shafts to support units to provide a static torque load during operation.

Specific Embodiments

By way of example, and according to some embodiments, the present invention may include, or take the form of, rotating equipment featuring a combination of driver equipment, driven equipment and a rotating shaft coupling.

The driver equipment may include a driver support with a stationary driver shaft connected thereto, and may also includes a driver arranged on the driver support with a driving shaft configured to rotate and provide a rotational torque.

The driven equipment may include a driven unit support with a stationary driven unit shaft connected thereto, and may also include a driven unit arranged on the driven unit support with a driven shaft configured to respond to the rotational torque and rotate.

The rotating shaft coupling may be configured to couple the driving shaft to the driven shaft and apply the rotational torque from the driving shaft to the driven shaft.

The stationary driver shaft may be coupled to the stationary driven unit shaft and configured to provide a static torque load to counteract the rotational torque applied from the driving shaft to the driven shaft during operation.

According to some embodiments of the present invention, the rotary equipment may also include one or more of the features, as follows:

The stationary driver shaft may be connect a side of the driver support; and the stationary driven unit shaft may be connected to a corresponding side of the driven unit support.

The stationary driver shaft may include a stationary driver shaft end; the stationary driven unit shaft may include a stationary driven unit shaft end; and the stationary driver shaft end and the stationary driven unit shaft end may interface so that each rotating shaft can be positioned to achieve a rotating shaft alignment, and then a torsional preload can subsequently be applied statically.

The stationary driver shaft end may include a stationary driver shaft flange; the stationary driven unit shaft end may include a stationary driven unit shaft flange; and the stationary driver shaft flange and the stationary driven unit shaft flange may be configured to couple together, e.g., using bolts, welding, etc.

In operation, torque applied to the stationary driver shaft and the stationary driven unit shaft is in the opposite direction of the rotational torque applied, and acts on both the driver support and the driven unit support to restore the alignment of the driving shaft and the driven shaft under load.

The driver equipment may include a driver equipment base, and the driver support may be arranged on the driver equipment base; and the driven equipment may include a driven equipment base, and the driven support may be arranged on the driven equipment base.

The driver support may include four driver support legs arranged on the driver equipment base; and the driven support may include four driven support legs arranged on the driven equipment base.

The rotating equipment may include, or take the form of, a pump system having a motor and a pump. The driver may include the motor, and the driven unit include the pump.

The stationary driver shaft and the stationary driven shaft may be arranged below the rotating shaft coupling.

BRIEF DESCRIPTION OF THE DRAWING

The drawing includes a sole FIGURE, which is not necessarily drawn to scale, as follows:

FIG. 1 is a diagram of rotating equipment, according to some embodiments of the present invention.

DETAILED DESCRIPTION OF THE INVENTION

By way of example, FIG. 1 shows rotating equipment generally indicated as 10 featuring: driver equipment generally indicated as 20, driven equipment generally indicated as 30 and a rotating shaft coupling 40.

The driver equipment 20 include a driver support 22 with a stationary driver shaft 24 connected thereto, and also includes a driver 26 arranged on the driver support 22 with a driving shaft 28 configured to rotate and provide a rotational torque.

The driven equipment 30 includes a driven unit support 32 with a stationary driven unit shaft 34 connected thereto, and also includes a driven unit 36 arranged on the driven unit support 32 with a driven shaft 38 configured to respond to the rotational torque and rotate.

The rotating shaft coupling 40 is configured to couple the driving shaft 28 to the driven shaft 38 and apply the rotational torque from the driving shaft 28 to the driven shaft 38.

The stationary driver shaft 24 is coupled to the stationary driven unit shaft 34 and configured to provide a static torque load to counteract the rotational torque applied from the driving shaft 28 to the driven shaft 38 during operation.

The stationary driver shaft 24 is connected to a side 22s of the driver support 22; and the stationary driven unit shaft 32 is connected to a corresponding side 32s of the driven unit support 32, e.g., consistent with that shown in FIG. 1.

The stationary driver shaft 24 has a stationary driver shaft end 24a; the stationary driven unit shaft 34 has a stationary driven unit shaft end 34a; and the stationary driver shaft end 24a and the stationary driven unit shaft end 34a interface so that each rotating shaft 28, 38 can be positioned to achieve the rotating shaft alignment, and then a torsional preload can subsequently be applied statically.

The stationary driver shaft end 24a may include a stationary driver shaft flange 24b; the stationary driven unit shaft end 34a may include a stationary driven unit shaft flange 34b; and the stationary driver shaft flange 24b and the stationary driven unit shaft flange 34b may be configured to couple together, e.g., using bolts, welding, etc.

In operation, torque applied to the stationary driver shaft 24 and the stationary driven unit shaft 34 is in the opposite direction of the rotational torque applied from the driving shaft 28 to the driven shaft 38 during operation, and acts on both the driver support 22 and the driven unit support 32 to restore the alignment of the driving shaft 28 and the driven shaft 38 under load.

The driver equipment 20 may include a driver equipment base 50, and the driver support 22 may be arranged on the driver equipment base 50. The driven equipment 30 may include a driven equipment base 60, and the driven support 32 may be arranged on the driven equipment base 60.

The driver support 22 may include four driver support legs 22a, 22b, 22c, 22d arranged on the driver equipment base 50. The driven support 32 may include four driven support legs 32a, 32b, 32c, 32d arranged on the driven equipment base 60.

The stationary driver shaft 24 and the stationary driven shaft 34 may be arranged below the rotating shaft coupling 40.

The Rotating Equipment

By way of example, and in addition to the pumping system mentioned herein, the rotating equipment may include, or take the form of, a cooling system having a motor driving a condenser, a fan system having a motor driving a fan, etc. Moreover, the embodiments are envisioned, and the scope of the invention is intended to include, implementing the present invention in other types or kinds of rotating equipment, e.g., either now known or later developed in the future.

Tall Assembly

As one skilled in the art would appreciate, a tall assembly for rotating equipment may include, or take the form of, an assembly where the shaft is significantly removed from the base/foundation, e.g., consistent with that shown in FIG. 1. By way of example, the tall assembly for rotating equipment may include driver support legs and corresponding driven unit support legs for removing the driver and driven unit from the driver equipment base and the driven equipment unit, e.g., by some predetermined distance. The longer that the predetermined distance is, the more removed that the driver and driven unit is from the driver equipment base and the driven equipment unit, the taller that the rotating equipment is understood to be, and the more likely that the misalignment between the driving shaft and the driven shaft may become too large for any sort of flexible coupling. Moreover, embodiments are envisioned in which the driver and driven unit may be more farther removed (i.e., more tall) from the driver equipment base and the driven equipment unit for some types or kinds of applications of the rotating equipment, or alternatively in which the driver and driven unit may be less farther removed (i.e., less tall) from the driver equipment base and the driven equipment unit for other types of kinds of applications of the rotating equipment. In other words, the degree of tallness of any particular assembly may depend on the particular application. For all these reasons, the scope of the invention is not intended to be limited to any particular predetermined distance, or any particular degree of tallness, or how far removed the driver and driven unit is from the driver equipment base and the driven equipment unit in relation to implementing the present invention to solve problems related to the misalignment between the driving shaft and the driven shaft according to the present invention.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein may not be drawn precisely to scale.

Although the invention has been described and illustrated with respect to exemplary embodiments thereof, the foregoing and various other additions and omissions may be made therein and thereto without departing from the spirit and scope of the present invention.

What is claimed is:

1. Rotating equipment comprising:
   driver equipment having a driver support with a stationary driver shaft connected thereto, and also having a driver arranged on the driver support with a driving shaft configured to rotate and provide a rotational torque;
   driven equipment having a driven unit support with a stationary driven unit shaft connected thereto, and also having a driven unit arranged on the driven unit support with a driven shaft configured to respond to the rotational torque and rotate; and
   a rotating shaft coupling configured to couple the driving shaft to the driven shaft and apply the rotational torque from the driving shaft to the driven shaft;

the stationary driver shaft being coupled to the stationary driven unit shaft and configured to provide a static torque load to counteract the rotational torque applied from the driving shaft to the driven shaft during operation.

2. The rotating equipment according to claim 1, wherein the stationary driver shaft has a stationary driver shaft end; the stationary driven unit shaft has a stationary driven unit shaft end; and the stationary driver shaft end and the stationary driven unit shaft end interface so that each rotating shaft can be positioned to achieve rotating shaft alignment, and then a torsional preload can subsequently be applied statically.

3. The rotating equipment according to claim 2, wherein the stationary driver shaft end includes a stationary driver shaft flange; the stationary driven unit shaft end includes a stationary driven unit shaft flange; and the stationary driver shaft flange and the stationary driven unit shaft flange are configured to couple together.

4. The rotating equipment according to claim 1, wherein the stationary driver shaft is connected to a side of the driver support; and the stationary driven unit shaft is connected to a corresponding side of the driven unit support.

5. The rotating equipment according to claim 1, wherein the static torque load provided by the stationary driver shaft is in an opposite direction of the rotational torque applied, and acts on both the driver support and the driven unit support to restore the alignment of the driving shaft and the driven shaft under load.

6. The rotating equipment according to claim 1, wherein the driver equipment includes a driver equipment base, and the driver support is arranged on the driver equipment base; and the driven equipment includes a driven equipment base, and the driven support is arranged on the driven equipment base.

7. The rotating equipment according to claim 6, wherein the driver support includes four driver support legs arranged on the driver equipment base; and the driven support includes four driven support legs arranged on the driven equipment base.

8. The rotating equipment according to claim 1, wherein the rotating equipment includes a pump system having a motor and a pump.

9. The rotating equipment according to claim 8, wherein the driver includes the motor, and the driven unit includes the pump.

10. The rotating equipment according to claim 1, wherein the stationary driver shaft and the stationary driven shaft are arranged below the rotating shaft coupling.

\* \* \* \* \*